PARITY CHECK SYSTEM

Filed Oct. 31, 1952 2 Sheets-Sheet 1

INVENTOR.
Linder C. Hobbs
BY [signature]
ATTORNEY.

PARITY CHECK SYSTEM

Filed Oct. 31, 1952 2 Sheets-Sheet 2

INVENTOR.
Linder C. Hobbs
BY Morris [signature]
ATTORNEY.

United States Patent Office 2,719,959

Patented Oct. 4, 1955

2,719,959

PARITY CHECK SYSTEM

Linder C. Hobbs, Haddonfield, N. J., assignor to Radio Corporation of America, a corporation of Delaware Application October 31, 1952, Serial No. 317,877

14 Claims. (Cl. 340—147)

Figure 1:
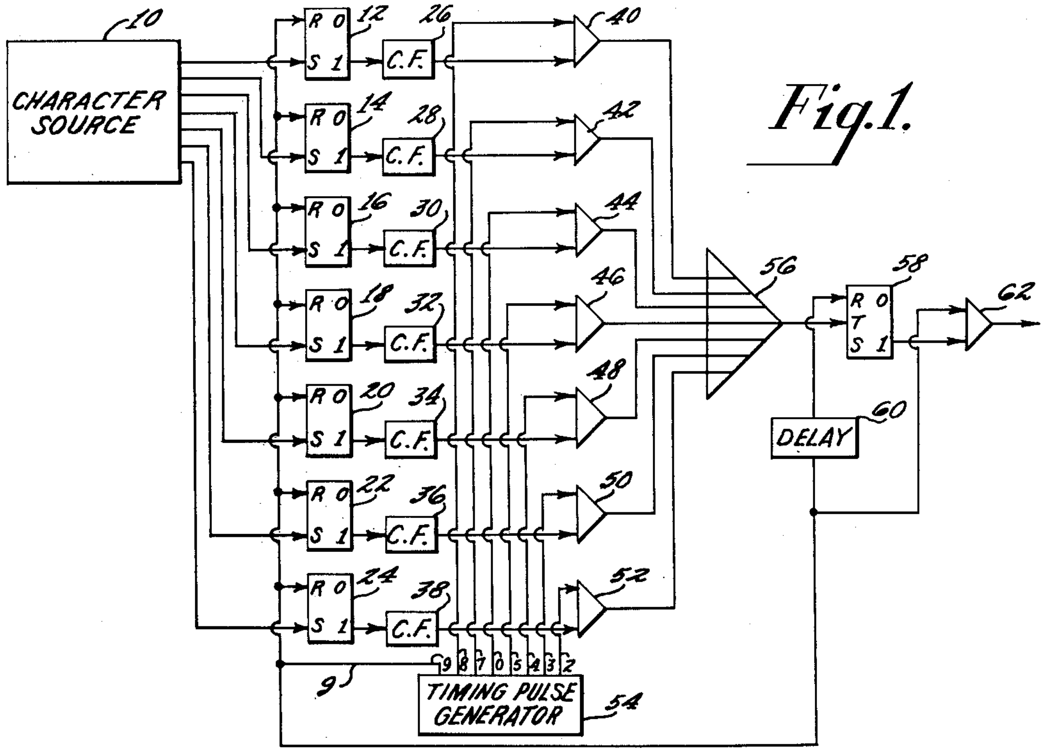

This invention relates to electronic computers and information handling machines, and more particularly to an improvement in apparatus for checking the operation of such machines which make use of a coded information.

The preponderance of digital computers and information handling machines which are presently in being, or in the process of being built, all contemplate the usage of binary codes. Both numbers and letters are binary coded. These machines receive information directly in the binary code or convert information not in code into the binary sode. Further processing in the machine is all performed in the binary code and the machine output usually is converted from the binary code to information which can be readily read by the user.

The internal operations of a machine using the coded information, in all cases, are supposed to be correct and error-free. As a practical matter, however, errors do occur. These can be corrected in some cases by either a repetition of the process or by going back to the point of origination of the error and waiting at that point until correction can be made from outside the machine. A system must be established to detect the occurrence of an error, since it is advantageous to catch these errors at the time of occurrence, thus preventing the subsequent operation of the machine to provide erroneous answers. Detecting the occurrence of an error also can be used as an indication of that portion of a machine which is misfunctioning. This is important, since, in view of the complexity of these machines, finding defective apparatus can be a very difficult and tedious operation.

A large percentage of the errors which occur during the operation of a machine can be detected at the time they occur by introducing a certain amount of redundancy into the information being handled. By this device it is possible to both detect and correct these errors. Simple error detecting codes such as the two-out-of-five and three-out-of-seven codes used in control systems or radio telegraphy are examples of the use of redundancy to detect errors. A complete description of these codes may be found in the article by Alt, "A Bell telephone laboratories computing machine," published in Mathematical Tables and Other Aids to Computing, vol. 3, January 1948 and April 1948. Still another form of redundant code for simple error detection is described by R. W. Hamming in an article entitled "Error detecting and error correcting codes," in the Bell System Technical Journal, volume 29, April 1950. This simple code is one wherein a single binary digit is added to a binary coded character (a character consists of a binary number representing a decimal number or a letter) such that the number of ones in every binary character is always odd, or, if desired, may be made always even. This redundant code system is called parity and the check is called a parity check. The embodiment of the present invention is directed to performing the operation of a parity check.

If a six binary digit code is used to represent either numbers or letters, each character, consisting of six binary digits, has associated therewith a seventh binary digit position wherein there is inserted either a one or a zero in order that the total number of ones in the character be even or odd as desired. As previously indicated, parity may be either even or odd. An illustration of a parity generator may be found described in application Serial No. 314,626, filed October 14, 1952, now U. S. Patent No. 2,674,727 dated April 6, 1954 by Arnold Spielberg for "Parity Generator."

Apparatus for parity checking has been known heretofore. This usually consists of a machine for statiscizing the code plus the parity check. (By "statiscizing" is meant the conversion of the code in the form of pulses and no pulses to D. C. levels.) Then the code which is statiscized is converted into a series of pulses which equal in number the number of "ones" in the code. The ones are then added and there is provided output indicative of proper parity. The known apparatus for performing this type of operation is rather complex and requires a number of steps which slow up its operation.

Accordingly, it is an object of this invention to provide a novel and simple parity checking apparatus.

It is a further object of this invention to provide parity checking apparatus capable of more rapid operation than the sequentially operated systems known heretofore.

Still a further object of this invention is to provide parity checking apparatus in which the number of steps required to check the parity of any parallel code is less than heretofore.

These and further objects of the invention are achieved by statiscizing the parallel existing code by means of binary elements such as trigger circuits. A trigger circuit is allotted to each track or binary digit existing in a character whose parity is to be checked. The trigger circuits are driven from a first to a second condition of stability by each of the ones in a binary code which are applied thereto. Timing pulses are then applied to the trigger circuits in sequence in a manner to reset the trigger circuits to their first condition of stability. The outputs of all the trigger circuits are applied either to another trigger circuit or to the last trigger circuit receiving the last of the sequentially applied pulses. These outputs serve to trip the checking trigger circuit which receives them once for each succeeding pulse from one to another of its two conditions of stability. The output of the checking trigger is coupled to a gate which is primed only when the checking trigger is in its second stable condition. The last of the timing pulses, after being delayed, is applied to drive the checking trigger circuit back to its first condition of stability if it is in its second condition of stability. If it is already in its first condition of stability, of course, the last timing pulse has no effect thereon. This last timing pulse in both of the above embodiments is also applied, without any delay, to the gate. Accordingly, if the gate is primed, an output pulse is obtained. Thus, the last timing pulse serves to determine, by the presence or absence of an output pulse responsive thereto, whether or not the number of ones in the character being parity checked is proper.

Figure 2:
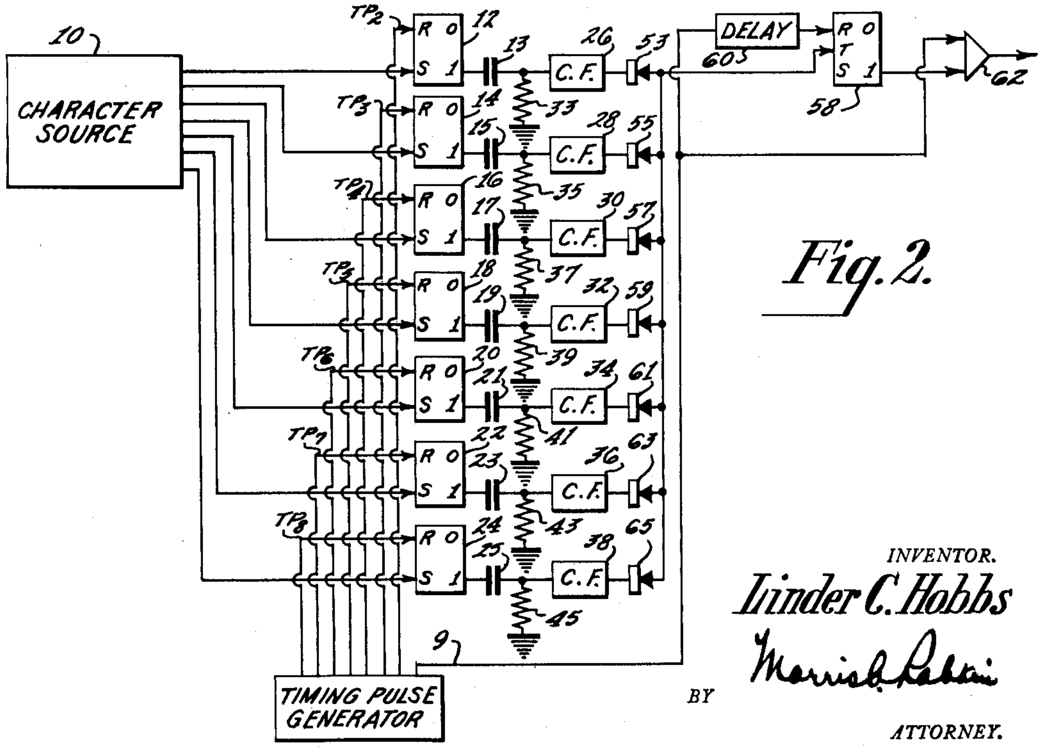
Figure 3:
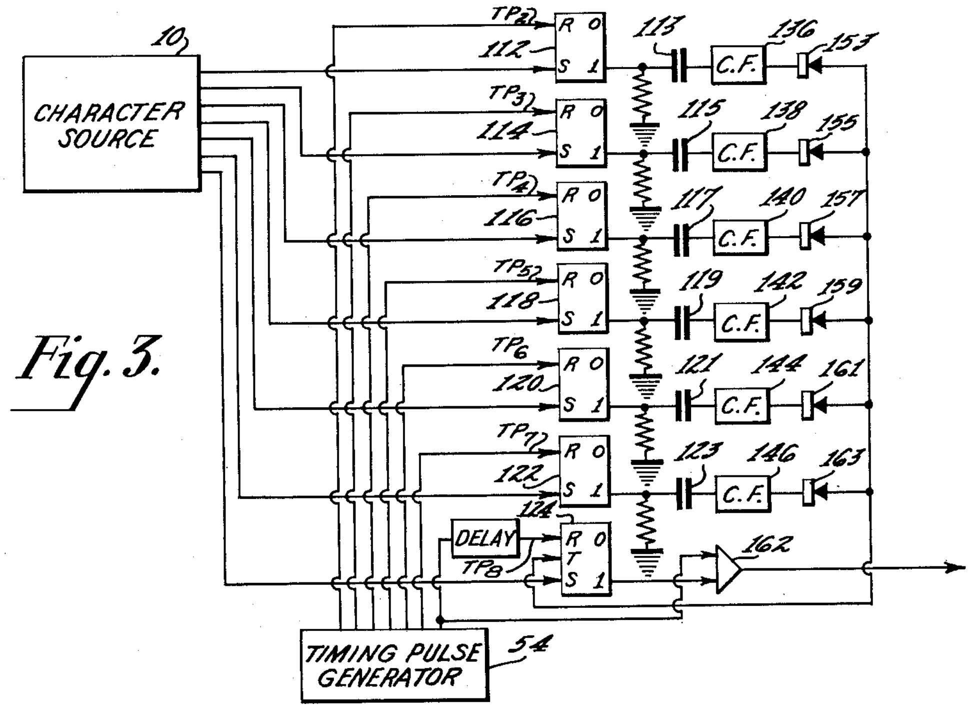
Figure 4:
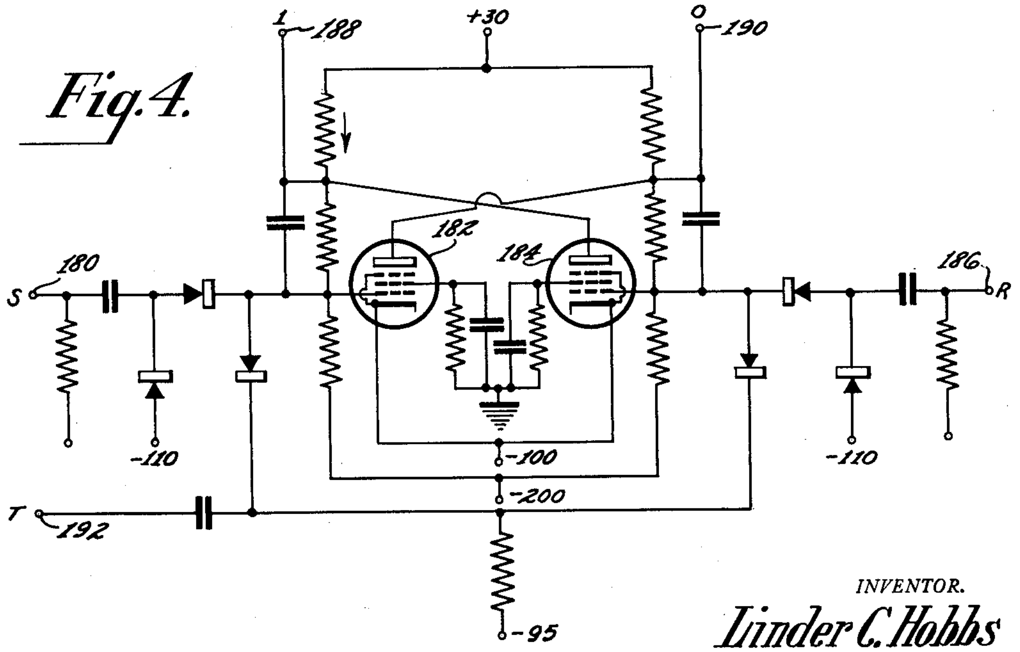

The novel features of the invention, as well as the invention itself, both as to its organization and method of operation, will best be understood from the following description, when read in connection with the accompanying drawings, in which, Figure 1 illustrates the prior art type of parity checker, Figures 2 and 3 are schematic diagrams of two embodiments of the present invention, and Figure 4 is a circuit diagram of a trigger circuit which may be used in the embodiments of the invention.

The code for which the present invention is used as a parity checking system is a binary code and is preferably a parallel existing code wherein the electrical representations of the binary digits exist simultaneously on parallel tracks or channels. This is opposed to a serial code where each binary character is represented by a train of time-spaced pulses. By way of illustration, but not to be construed as a limitation herein, a six digit binary code is being described here with a seventh digit added thereto for parity purposes. The seven binary digits accordingly are representative of a character. The code is taken also to be one wherein presence of a one is manifested by a positive pulse and a zero by no pulse. Other binary representations, such as positive and negative pulses for ones and zeroes, may be used with modifications to the apparatus shown herein which are known to those skilled in the art without departing from the scope of the inventive concept.

Referring now to Fig. 1, the schematic diagram shown therein is that for a parity checking apparatus for a seven bit character and is an example of the parity checking systems used heretofore. Each binary digit, from a character source, 10, is applied to the set terminal of a binary element or trigger circuit 12 through 24. The binary elements 12 through 24 which are contemplated herein are those which have two stable conditions and permit transfer from one stable condition to the other by application of pulses to terminals labeled in the diagrams as "S" and "R" ("Set" and "Reset"). Where required, the binary elements should have a third terminal, labeled as "T" in the diagrams ("Trigger"), whereby pulses which are applied thereto will transfer an element from its first to its second condition and back to its first condition responsive to each one of these applied pulses. In Fig. 1, there will be seen connections between the source of the six binary digit plus parity digit character and the set terminals of each one of the trigger circuits which are provided for each one of the binary digits. If a binary one exists on any one of the tracks, the trigger circuit is driven from its first condition to its second condition of stability. In being thus driven, the potential level at the output "one" is changed from a low to a high potential.

The outputs from the various trigger circuits are respectively applied through cathode followers 26 through 38 to one input of respectively associated coincident gates 40 through 52. The coincidence gate (commonly known as an "and" gate) is one wherein a signal must exist on each one of the input lines coincidentally before an output is obtainable. A timing pulse generator 54 provides a sequence of timing pulses to each one of the other of the two coincidence gate inputs. Any known generator of pulses in sequence may be used for the timing pulse generator. Accordingly, as each one of the timing pulses is applied to each one of the coincidence gates, an output is obtained in sequence from those of the gates which are primed by an output from the cathode followers of the associated trigger circuits which were turned over to their second stable condition by the application of a "one" binary digit. The other coincidence gates which are not primed (since the application of a zero binary digit does not affect the trigger circuits) will not provide an output pulse. Each one of the output pulses is applied to a buffer 56 which provides an output which is applied to the trigger terminal of a checking trigger circuit 58. This trigger circuit is driven between its two stable conditions as a result of receiving a sequence of pulses corresponding to the ones in the binary character being checked.

The last of the timing pulses is applied to all the reset terminals of the statiscizing trigger circuits and through a delay circuit 60 to the reset terminal of the checking trigger circuit. This last timing pulse drives to the first or starting stable condition all of the trigger circuits, but the slight delay in its application to the reset terminal of the checking trigger circuit prevents the trigger output level from changing immediately. If the checking trigger circuit is not in its first stable condition but is in its second stable condition when the last of the timing pulses arrives, its output will be high (and will remain high for the period of the delay in series with its reset terminal). This serves to prime an output coincidence gate 62, since the "one" output terminal of the checking trigger is connected to one of the inputs of the output coincidence gate. The last timing pulse is applied to the other input of the output coincidence gate and thus the primed gate provides an output pulse. The checking trigger circuit is reset by the last timing pulse, after the delay period, thus removing the priming of the output coincidence gate. If a pulse is received at the output of this gate, 62, it is indicative that an odd parity exists.

As a numerical illustration of the operation of the system, assume that the seven-bit code character being checked is 1101010. This has four "ones" in the character. Accordingly, the checking trigger circuit will be driven four times and will end up in its first stable condition. When the last timing pulse is applied, no output pulse will be derived responsive thereto. This is indicative of the fact that an even number of ones exist in the code, and if the parity chosen is odd, it is also indicative of the fact that the code does not contain proper parity and an error exists in the code.

The circuit complexities involved by the use of the plurality of coincidence gates, and the simultaneous resetting of the statiscizing trigger circuits 12 through 24 are obviated by the embodiment of the invention shown in Fig. 2. The same number of trigger circuits is used, one for each binary digit and for checking purposes. Similar functioning apparatus have the same reference numerals applied thereto as in Fig. 1. However, the coincidence gates 40 through 52 are eliminated. The character comprising a plurality of binary digits is applied to the trigger circuits 12 through 24 as heretofore, so that any one digit will drive a trigger circuit from its first to its second condition of stability to make its "one" output go high, whereas a "zero" digit will not affect the trigger circuit and will leave it in its first condition of stability. Each one of the sequence of timing pulses is applied to a different one of the trigger circuits in sequence to restore them to their first condition of stability, if they are not already there, thus making the "one" output go low. The output from the "one" output terminal of each one of the trigger circuits is connected through its own differentiating network, these networks consisting, respectively, of a series condenser, 13 through 25, and a shunt resistor, 33 through 45, to the associated cathode follower 26 through 38. The effect of the differentiating networks is to convert the negative going output from each trigger circuit being reset to a negative pulse. The outputs of all the cathode followers are respectively connected through rectifiers 53 through 65 to the trigger input of the checking trigger circuit 58. Output from the "one" output terminal of the checking trigger circuit is connected to one input of the output coincidence gate 62. The last of the timing pulses is applied through a slight delay network 60 to reset the checking trigger circuit to its first condition of stability. This last of the timing pulses is also directly applied to the other input of the output coincidence gate.

In operation, each one of the trigger circuits assumes a first or second condition of stability, depending upon whether or not the applied binary digit is zero or one. The sequence of timing pulses resets each trigger circuit to its first condition of stability, if it is not already there. The differentiated outputs of those trigger circuits which are driven from their second to their first condition of stability drive the indicating trigger circuit between its two stable conditions. The last of the timing pulses drives the indicating trigger circuit to its first stable condition if it is not already there. However, the output level will not change immediately because of the delay in series with the reset terminal. An output pulse is provided from gate 62 at the time of the last timing pulse if the parity for the character being checked is odd, since the indicating trigger circuit will be placed in its second stable condition by an odd number of trigger pulses and will not have changed back to its first stable condition by the time of the last time pulse because of the delay in the reset circuit. (The system may be used for even parity check indicated by no pulse.)

It should be pointed out that in sequentially resetting each of the trigger circuits by the timing pulses instead of simultaneously resetting them as shown in Figure 1, the circuit does not jitter and require an excessive settling down time to be ready for the next check. Furthermore, the likelihood of false output is diminished.

An even simpler parity checking circuit and a preferred embodiment of the invention may be seen by referring to Fig. 3 of the drawings. A trigger circuit 112 through 124 is provided for each one of the binary digits in the character being checked. The input connections for each one of the binary digits and for the timing pulses is the same as was previously described in Figure 2. However, the outputs of all of the trigger circuits except the one, 124, to receive the last of the timing pulses are applied to the trigger input of this last trigger circuit through respective differentiating networks 113 through 123, and their associated cathode followers 136 through 146 and rectifiers 153 through 163. This last trigger circuit 124 is used as a checking trigger circuit. An output level from the "one" output terminal of this checking trigger circuit, as well as the last of the timing pulses, is applied to the output coincidence gate 162, and an output from the coincidence gate 162 is indicative of odd parity. It will be seen that, when the binary digits are initially applied to each one of the trigger circuits, each one of the trigger circuits assumes the first or second stable condition, in accordance with the zeros and ones, respectively, of the character. When the timing pulses are applied, the trigger circuits in their second stable condition provide outputs, in being reset, which serve to drive the checking trigger circuit from whatever condition it initially assumed as a result of the application of the seventh binary digit, between its stable conditions, leaving it finally in that one of the two stable conditions which is determined by the total number of ones in the character being checked. The last of the timing pulses applied through a delay circuit 160 to the reset terminal of the last trigger circuit restores this trigger circuit to its starting condition, but, because of the delay, the output level does not change until slightly after the last timing pulse has been applied to the output coincidence gate 162. If this output level is high, this level and the last timing pulse will cause an output pulse from gate 162 indicative of an odd parity. It will be seen that only eight timing pulses are required for parity checking in this instance, thus speeding the operation. Further, the need for one trigger circuit is eliminated and the system is thus simpler and cheaper.

Figure 4 shows a circuit diagram of a trigger circuit which may be used in place of each one of the trigger circuit rectangles shown in the drawings. The trigger circuit is commonly known in the art and detailed description of it may be found in "Electron Tube Circuits," by Seely, published by McGraw-Hill Book Company, Inc., on page 420. The "Set" input terminal 180, designated as "S," is coupled to the grid of one of the two tubes 182, 184 used in the trigger circuit. When a positive pulse is applied to this input terminal, it will cause conduction in the tube coupled thereto and the other tube will be cut off. A Reset input terminal, 186, designated as "R," is coupled to the grid of the other tube 184 of the trigger circuit pair 182, 184. A pulse applied to the reset terminal will cause the tube connected thereto to conduct, thereby cutting off the conduction of the other tube. The anode of the tube 182, which is coupled to the Set terminal 180 is connected to a plate load resistor and to an output terminal 190 designated as the zero output terminal. The anode of the tube 184, which is coupled to the Reset terminal is connected to an anode load resistor and to an output terminal 188 which is designated as the "one" output terminal. The anodes of both tubes 182, 184 are cross-connected to the grids of the other two in well known fashion through coupling resistors and condensers. A negative pulse applied to the "Trigger" input terminal 192, designated as "T," which is connected to both grids through rectifiers, has the effect of interchanging the conduction of the trigger circuit tubes.

Buffer and coincidence gates are well known in the art and are found described in the literature. An example of suitable buffer and coincidence gates may be found described and shown in an article by Tung Chang Chen, "Diode coincidence and mixing circuits in digital computers," on page 511 of the Proceedings of the I. R. E. for May 1950.

Cathode followers are also well known in the art, and may be found described in "Electron Tube Circuits," by Seely, on page 102.

Delay circuits of the type required herein are those which will provide sufficient time for the output coincidence gate to operate before the checking trigger circuit is reset. Accordingly, an electrical network or one of the linear delay circuits described on pages 424 et seq. in the above noted text by Seely may be used.

There has been shown and described above a novel, simple, economical and rapidly operating parity checking system whereby parity may be checked for a character electrically represented in the binary code.

What is claimed is:

1. A circuit for parity checking binary coded characters wherein each of the binary digits of a character is represented electrically by signals comprising a plurality of binary elements each of which has a first and a second stable condition and provides an output when driven from one to the other of said two stable conditions, means to apply each of the binary digit signals of a character to a separate one of said binary elements to leave each of said elements to which zero binary digit signals are applied in its first of stable conditions and to drive each of said elements to which one binary digit signals are applied to its second stable condition, means to restore in sequence to said first stable condition all said elements in said second stable condition, and means in circuit with all said binary elements and responsive to outputs from said elements being restored and to said restoring means to provide an output indicative of the correctness of the parity for the tested character.

2. A circuit for parity checking binary coded characters wherein each of the binary digits of a character is represented electrically by signals comprising a plurality of binary elements each of which has a first and a second stable condition and provides an output when driven from one to the other of said two stable conditions, means to apply each of the binary digit signals of a character to a separate one of said binary elements to leave each of said elements to which a zero binary digit signal is applied in said first stable condition and to drive each of said elements to which a one binary digit signal is applied to its second stable condition, means to restore in sequence to said first stable condition all said elements in said second stable condition, means responsive to outputs from said elements being restored to drive from one to the other of said two stable conditions the last one of said binary elements in said sequence, and means to derive an output from said last binary element indicative of the correctness of the parity for the tested character.

3. A circuit for parity checking binary coded characters wherein each of the binary digits of a character is electrically represented by signals comprising a plurality of binary elements each of which has two stable conditions and provides an output when driven from one to the other of said two stable conditions, means to apply each of the binary digit signals of a character to a separate one of said binary elements to leave each of said elements to which a zero binary digit signal is applied in a first of said two stable conditions and to drive each of said elements to which a one binary digit signal is applied in a second of said two stable conditions, means to restore in sequence to said first stable condition all said elements in said second stable condition, means to drive one of said binary elements from one to the other of said two stable conditions responsive to outputs from the others of said elements being restored, and means to test the condition of said one binary element to determine by said condition the correctness of the parity for the tested character.

4. A circuit for parity checking binary coded characters wherein each of the binary digits of a character is represented electrically by signals comprising a plurality of bistable trigger circuits each of which has a first and a second stable condition and provides an output when driven from one to the other of said two stable conditions, means to apply each of the binary digit signals of a character to a separate one of said trigger circuits to leave each of said trigger circuits to which a zero binary digit signal is applied in said first stable condition and each of said trigger circuits to which a one binary digit signal is applied in said second stable condition, means to apply pulses in sequence to all of said trigger circuits to restore to said first stable condition those of the trigger circuits in said second stable condition, means to apply the output from each of said trigger circuits being restored to another of said plurality of trigger circuits to drive it between said first and second stable conditions, a coincidence gate having two inputs, means to apply the output from said another trigger circuit when in its second condition of stability to one of said coincidence gate inputs, means to apply a last of the pulses from said means to apply pulses to the other input of said coincidence gate inputs whereby the presence or absence of an output from said coincidence gate is indicative of the correctness of the parity of the character being tested, a delay circuit, and means to also apply said last of the pulses through said delay circuit to reset said another trigger circuit in its first condition of stability.

5. A circuit for parity checking binary coded characters wherein each of the binary digits of a character is represented electrically by signals comprising a plurality of bistable trigger circuits each of which has a first and a second stable condition and provides an output when driven from one to the other of said two stable conditions, means to apply each of the binary digit signals of a character to a separate one of said trigger circuits to leave each of said trigger circuits to which a zero binary digit signal is applied in said first stable condition and each of said trigger circuits to which a one binary digit signal is applied in said second stable condition, means to apply pulses in sequence to all of said trigger circuits except a last one to restore to said first stable condition those of said trigger circuits in said second stable condition, means to apply the outputs from each of said trigger circuits being restored to said last trigger circuit to drive it between said first and second conditions, a coincidence gate having two inputs, means to apply the output from said last trigger circuit when in its second condition of stability to one of said coincidence gate inputs, means to apply a last of the pulses from said means to apply pulses to the other input of said coincidence gate whereby the presence or absence of an output from said coincidence gate responsive to said last of said sequence of pulses is indicative of the correctness of the parity of the character being tested, a delay circuit, and means to also apply said last of said pulses through said delay circuit to reset said last trigger circuit to its first condition of stability.

6. A circuit as recited in claim 4 wherein each trigger circuit has a first input to which the application of a driving signal drives said trigger circuit to its first stable condition, a second input to which the application of a driving signal drives said trigger circuit to its second stable condition, and a trigger input to which the application of a driving signal drives said trigger circuit from one stable condition to the other, wherein said binary digit signals are applied to said second inputs and said pulses in sequence are applied to said first input, and wherein said means to apply the output from each of said trigger circuits being restored includes a differentiating circuit connected to receive an output from its associated trigger circuit, a cathode follower connected to receive output from its associated differentiating circuit and connections between the outputs of all said cathode followers and the trigger input of said another trigger circuit.

7. A circuit as recited in claim 5 wherein each trigger circuit has a first input to which the application of a driving signal drives said trigger circuit to its first stable condition, a second input to which the application of a driving signal drives said trigger circuit to its second stable condition, and a trigger input to which the application of a driving signal drives said trigger circuit from one stable condition to the other, wherein said binary digit signals are applied to said second inputs and said pulses in sequence are applied to said first input, and wherein said means to apply the output from each of said trigger circuits being restored includes a differentiating circuit connected to receive an output from its associated trigger circuit, a cathode follower connected to receive output from its associated differentiating circuit, and connections between the outputs of all said cathode followers and the trigger input of said last trigger circuit.

8. A circuit for parity checking binary coded characters wherein each of the binary digits of a character is electrically represented by signals, said parity check circuit comprising a plurality of binary elements each having two stable operating conditions respectively representative of said binary digits, each of said elements having input and output means, means to apply said binary digit signals to the input means of separate ones of said binary elements to change the operating conditions thereof from initial conditions in accordance with the binary digit signals, means to apply restoring signals in sequence to the input means of said binary elements to restore sequentially said binary elements to said initial conditions, means to apply to one of said binary elements output signals produced by all the others of said binary elements, said last mentioned applying means coupling the output means of said other binary elements to the input means of said one binary element, and means coupled to the output means of said one binary element to derive a parity check signal.

9. A circuit as recited in claim 8 wherein each of said binary elements is a trigger circuit.

10. A circuit as recited in claim 8 wherein said means to apply said binary digit signals is coupled to the input means of said one binary element to apply binary digit signals thereto.

11. A circuit as recited in claim 10 wherein each of said binary elements is a trigger circuit.

12. A circuit for checking coded signals comprising a plurality of binary elements, each of said binary elements having two operating conditions and providing an output signal when changing from one to the other of said operating conditions, means to apply coded signals to all of said binary elements, means to apply to one of said binary elements the output signals of all the others of said binary elements, said last-mentioned applying means coupling said other binary elements to said one binary element, and means to derive an output signal from said one binary element.

13. A circuit for checking coded signals comprising a plurality of binary elements, each of said binary elements having two stable operating conditions and separate input and output means, means to apply said coded signals to the input means of all of said binary elements to change the operating conditions thereof from initial conditions in accordance with said signals, means coupling the output means of all of said binary elements except one to the input means of said one binary element, and means to apply sequentially signals to the input means of the others of said binary elements to restore said other binary elements to their initial operating conditions.

14. A circuit as recited in claim 13 wherein each of said binary elements is a trigger circuit.

References Cited in the file of this patent

UNITED STATES PATENTS

| | | |
|---|---|---|
| 2,595,714 | Slayton | May 6, 1952 |
| 2,607,006 | Hoeppner | Dec. 7, 1954 |
| 2,696,600 | Serrell | Dec. 7, 1954 |